United States Patent [19]

Hamada et al.

[11] Patent Number: 4,921,065
[45] Date of Patent: May 1, 1990

[54] FOUR-WHEEL DRIVE MOTOR VEHICLE HAVING A CONTROLLED DIFFERENTIAL DEVICE

[75] Inventors: Tetsuro Hamada; Yoshiki Noro; Noboru Ashikawa, all of Saitama, Japan

[73] Assignee: Honda Giken Kogyo Kabushiki Kaisha, Tokyo, Japan

[21] Appl. No.: 175,827

[22] Filed: Mar. 31, 1988

[30] Foreign Application Priority Data

Mar. 31, 1987 [JP] Japan ................................ 62-079281

[51] Int. Cl.$^5$ .............................................. B60K 17/34
[52] U.S. Cl. .................................................... 180/245
[58] Field of Search ............... 180/197, 233, 245, 248, 180/249, 250; 74/710.5, 711, 714, 665 R, 665 F, 665 H, 665 L

[56] References Cited

U.S. PATENT DOCUMENTS

| | | | |
|---|---|---|---|
| 4,681,180 | 7/1987 | Oyama et al. | 180/76 |
| 4,685,352 | 8/1987 | Ohkubo | 180/248 |
| 4,754,835 | 7/1988 | Selter et al. | 180/233 |
| 4,770,266 | 9/1988 | Yamaguchi et al. | 180/248 |

FOREIGN PATENT DOCUMENTS 59-216766  2/1984  Japan .

Primary Examiner—Charles A. Marmor
Assistant Examiner—Richard Camby
Attorney, Agent, or Firm—Skjerven, Morrill, MacPherson

[57] ABSTRACT

A motor vehicle such as a four-wheel drive vehicle having a first axle shaft which is driven by a drive source and a second axle shaft which is driven by the same drive source, each of a pair of wheels associated with the second axle shaft being powered by way of individual variable torque transmitting devices, further comprising: a steering condition sensor; and a control unit which reduces a torque transmission ratio of one of the variable torque transmitting devices corresponding to the inner one of the wheels of the second axle shaft when the steering condition sensor has detected a steering angle greater than a prescribed value. Thereby, the problem of the tight turn braking can be avoided without losing the advantages of four-wheel drive. Other driving conditions such as braking and acceleration as well as an excessive temperature increase in each of the variable torque transmitting devices may be taken into consideration in carrying out the control of the variable torque transmitting devices which preferably consist of viscous couplings. Each of the viscous couplings is provided with means for externally varying the torque transmission ratio thereof and transmits torque between input and output thereof at a level which is substantially proportional to the speed difference between input and output thereof.

15 Claims, 5 Drawing Sheets

FOUR-WHEEL DRIVE MOTOR VEHICLE HAVING A CONTROLLED DIFFERENTIAL DEVICE

TECHNICAL FIELD

The present invention relates to a motor vehicle having more than one power-driven wheel set, such as a four-wheel drive motor vehicle, using a pair of variable torque transmission devices, such as viscous couplings of a variable power transmission ratio type, for driving the wheels of one of the wheel sets, and in particular to an improved four-wheel drive motor vehicle free from the problems, such as the tight turn braking, which are intrinsic to four-wheel drive motor vehicles.

BACKGROUND OF THE INVENTION

In a four-wheel drive motor vehicle, since the trajectories of the front wheels and the rear wheels deviate from each other during a cornering action of the vehicle, some difference arises between the rotational speeds of the front wheel set and the rear wheel set. Therefore, in a four-wheel drive motor vehicle in which the front wheel set and the rear wheel set are directly connected to each other or connected by way of a viscous coupling, it is known that the so-called tight turn braking may occur and some difficulty may be encountered in driving the motor vehicle when a tight turning action is made in a very low speed range. To the end of eliminating this problem, Japanese Patent Laid Open Publication No. 59-216,766 proposed to switch the state of the motor vehicle from a four-wheel drive condition to a two-wheel drive condition when the steering angle has exceeded a certain prescribed value. However, since the advantages of four-wheel drive is lost during the cornering action, this technology does not necessarily offer a satisfactory solution to this problem.

U.S. Pat. No. 4,681,180 proposes the use of a pair of hydraulic clutches of a variable transmission torque type for improving the dynamic lateral response of a rear wheel drive vehicle during a cornering action by supplying more torque to the outer rear wheel than to the inner rear wheel in a low speed range and by supplying more torque to the inner rear wheel than to the outer rear wheel in a high speed range. A steering sensor is used to detect the direction of the cornering action.

BRIEF SUMMARY OF THE INVENTION

In view of the above mentioned problem of the prior art four-wheel drive vehicle, a primary object of the present invention is to provide an improved motor vehicle using variable torque transmission devices such as viscous couplings which is free from problem of the tight turn braking.

A second object of the present invention is to provide a four-wheel drive motor vehicle which is free from the tight turn braking but retains the advantages of four-wheel drive even during a tight cornering action.

A third object of the present invention is to provide a four-wheel drive motor vehicle which can improve the stability of the vehicle during a braking action.

A fourth object of the present invention is to provide a four-wheel drive motor vehicle is provided with means for detecting abnormal conditions of the variable torque transmitting means.

These and other objects of the present invention will be accomplished by providing a motor vehicle having a first axle shaft which is driven by a drive source and a second axle shaft which is driven by the same drive source, each of a pair of wheels associated with the second axle shaft being powered by way of individual variable torque transmitting means, further comprising: steering condition sensor means for detecting a steering condition of the vehicle; control means which controls a torque transmission ratio of each of the variable torque transmitting means according to the steering condition detected by the steering condition sensor means.

Particularly favorable results can be obtained if the control means reduces the torque transmission ratio of one of the torque transmitting means corresponding to the inner one of the wheels of the second axle shaft relative to the other of the torque transmitting means corresponding to the outer one of the wheels of the second axle shaft when the value of the steering angle detected by the steering angle sensor is greater than a prescribed value which may be given as a mathematical function of a vehicle speed, and if the first axle shaft is coupled to a pair of steerable wheels while the second axle shaft is coupled to a pair of non-steerable wheels.

Since, during a cornering action, the trajectory of the inner non-steerable wheel particularly deviates from the averaged trajectory of the steerable wheels than the outer non-steerable wheel does, the tight turn braking can be avoided by reducing the transmission ratio of the variable torque transmitting means for transmitting power to the inner non-steerable wheel.

According to a certain aspect of the present invention, the torque transmission ratios of the two variable torque transmitting means are both increased when all the wheel are stationary and when the ratio of the maximum to the minimum of the rotational speeds of the wheels has exceeded a certain prescribed value. Thus, the necessary traction can be obtained when starting off the vehicle from a completely stationary state and when driving the vehicle in muddy, frozen or otherwise slippery terrain.

According to another aspect of the present invention, the torque transmission ratios of both the variable torque transmitting means are increased when a throttle opening, a throttle opening rate or a linear combination thereof is greater than a certain prescribed value. Thus, when the vehicle is accelerating, the variable torque transmitting means provide the necessary high traction.

According to yet another aspect of the present invention, in the case where the first axle shaft is a front axle shaft while the second axle shaft is a rear axle shaft, the torque transmission ratios of both the variable torque transmitting means are reduced when a brake device is activated so as to reduce the tendency of the rear wheels to lock up during an abrupt braking action.

According to yet another aspect of the present invention, the variable torque transmitting means comprises a pair of viscous couplings having means for externally varying the torque transmission ratios thereof, each transmitting a torque, from the drive source to the corresponding one of the wheels of the second axle shaft, at a level which is substantially proportional to a speed difference between input and output of the viscous coupling. In this case, the torque transmission ratios of both the viscous couplings are increased if the temperature sensor provided in either one of the viscous couplings has detected a temperature higher than a prescribed value in a low speed range. This is advantageous because it means that one of the wheels may be slipping and the traction of the wheels should be increased for better maneuverability of the vehicle. If this state persists even when the torque transmission ratios of both the viscous couplings are increased, a warning is issued because it may mean a fault in the system. If the temperature sensor has detected a temperature higher than a prescribed value in a high speed range, since one of the wheels may be oversized or undersized, it is advantageous if the torque transmission ratios of both the viscous couplings are reduced. If this state persists even when the torque transmission ratios of both the viscous couplings are reduced, a warning is issued because it may mean a fault in the system.

BRIEF DESCRIPTION OF THE DRAWINGS

Now the present invention is described in the following with reference to the appended drawings, in which.

DETAILED DESCRIPTION OF THE PREFERRED EMBODIMENT

Now an embodiment of the present invention is described in the following with reference to the appended drawings.

Figure 1:
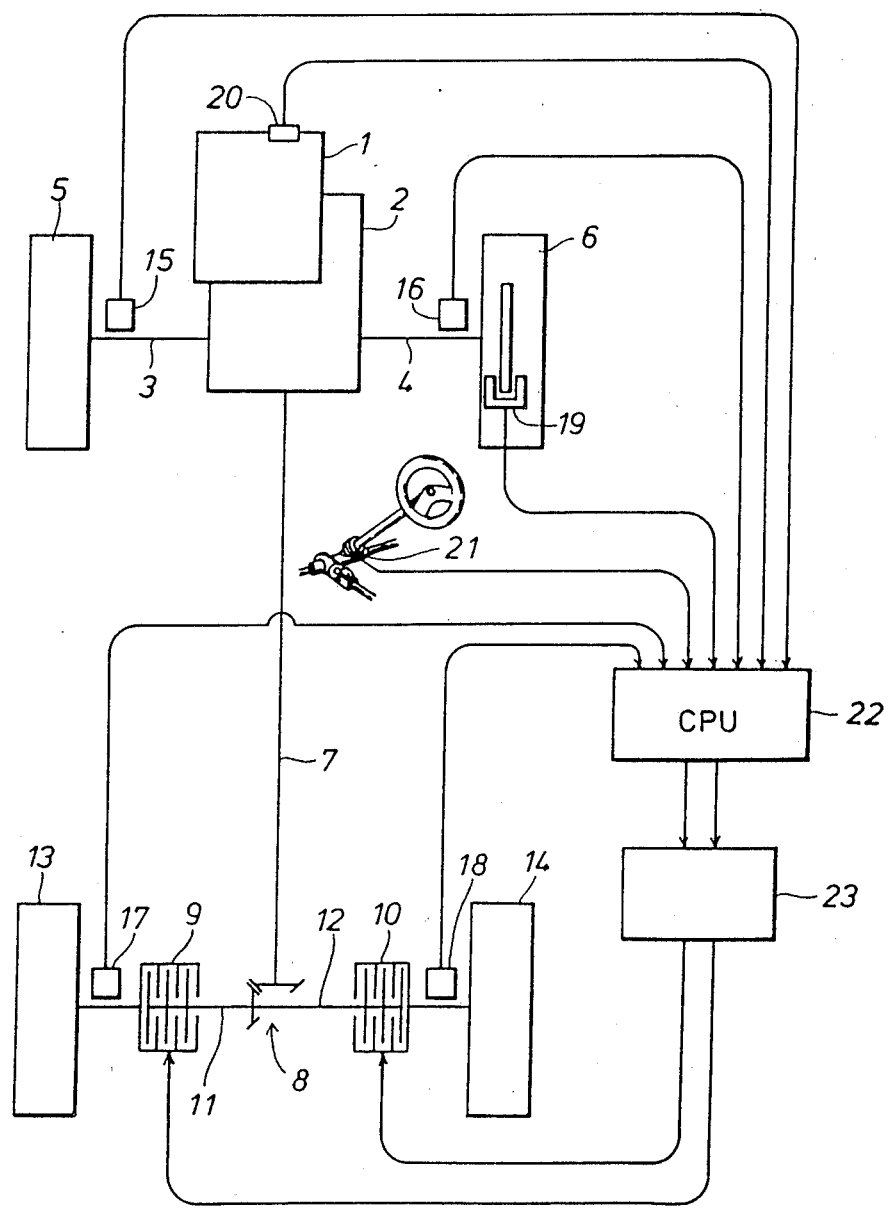
FIG. 1 is a block diagram showing a control structure of a four-wheel drive motor vehicle according to the present invention.

FIG. 1 is a schematic block diagram of the control structure of a four-wheel drive motor vehicle according to the present invention. Output of an engine 1 is transmitted to a right and a left axle shaft 3 and 4 by way of a transmission 2 incorporating a transfer or a power distributing device and also to a right and a left axle shaft 11 and 12 by way of a propeller shaft 7 and a final gear device 8. The front axle shafts 3 and 4 directly drive the right and the left wheel 5 and 6 while the rear axle shafts 11 and 12 drive the right and left wheel 13 and 14 by way of viscous couplings 9 and 10, respectively.

The wheels 5, 6, 13 and 14 are each provided with a speed sensor 15 through 18 and outputs from these speed sensors are supplied to a CPU 22. The CPU 22 controls the torque transmission ratios of these viscous couplings 9 and 10 by way of an actuator 23.

Figure 2:
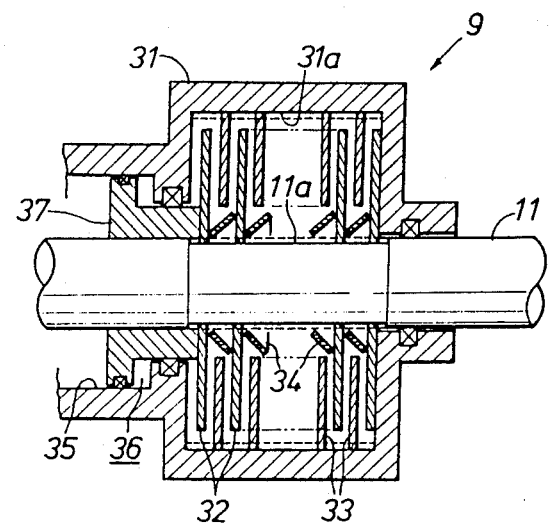
FIG. 2 is a simplified sectional view of a viscous coupling having means for externally varying the torque transmission ratio between input and output thereof.

The control of the torque transmission ratio of each of the viscous couplings 9 and 10 can be accomplished by adjusting, for instance, by means of a hydraulic actuator, the distances between a plurality of disks rotating relative to each other within viscous fluid. FIG. 2 shows an example of viscous coupling 9 of a variable torque transmission ratio type. The axle shaft 11 is received, in a fluid tight manner, within a cylindrical casing 31 which is directly connected to the wheel 13 by way of an intermediate shaft (not shown in the drawings) connected to this wheel. An intermediate part of the portion of the axle shaft 11 located within the casing 31 is provided with a splined portion 11a onto which are fitted a plurality of inner disks 32 so as to be integrally rotatable but freely axially slidable therewith. The inner circumferential surface of the casing 31 is provided with a splined portion 31a and carries, with this splined portion 31a, a plurality of outer disks 33 which are located so as to longitudinally alternate with the inner disks 32, in such a manner that these outer disks 33 integrally rotate with the casing 31 but freely slide with respect to the casing 31 along the longitudinal direction. A dish spring 34 is interposed between each pair of adjacent inner disks 32 so as to urge them apart from each other. A double acting piston 37 is received between a pair of hydraulic chambers 35 and 36 defined at one axial end of the casing 31 in such a manner that the piston 37 can press the inner disks 32 towards each other against the biasing force of the dish springs 34.

By thus controlling the hydraulic pressures applied to the hydraulic chambers 35 and 36 and displacing the double-acting piston 37 axially, the torque transmitted between the input shaft and the output shaft for a given difference in speed between them is increased and decreased depending on whether the gaps between the disks 32 and 33 which rotate relative to each other are reduced or increased.

Figure 3:
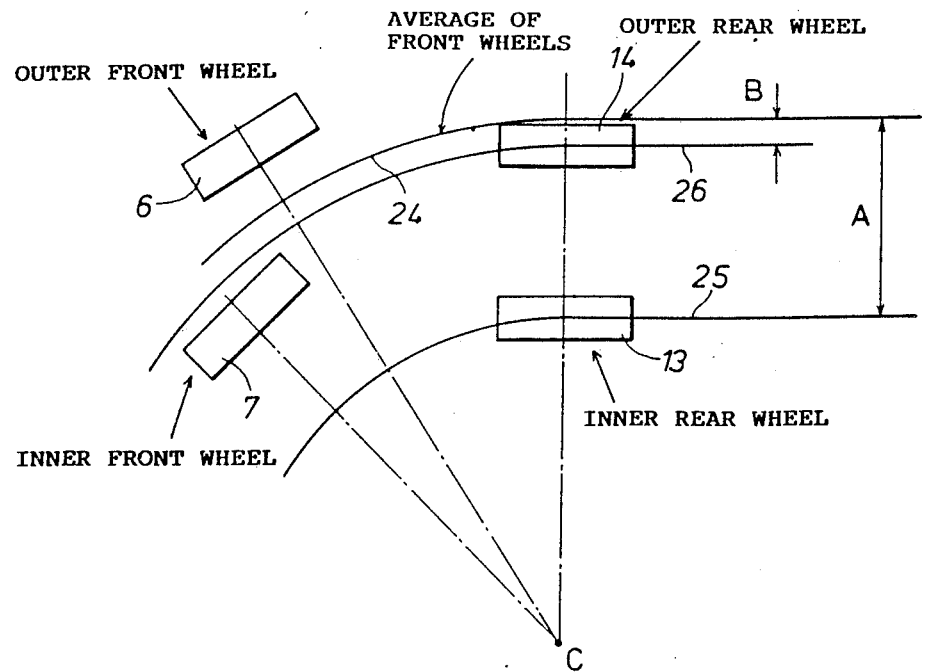
FIG. 3 is a line diagram showing the trajectories of the wheels of the vehicle as it makes a turn.

FIG. 3 shows the trajectories of the wheels of a motor vehicle as it undergoes a cornering action. In this motor vehicle, the front wheels 6 and 7 are steered but the rear wheels 13 and 14 are not normally steered. Therefore, the center C of rotation of the vehicle is located on an extension line of the axle shaft of the rear wheels 13 and 14. Therefore, when the deviations of the trajectories 25 and 26 of the rear wheels 13 and 14 from the average trajectory 24 of the front wheels 5 and 6 are considered, the deviation A of the inner rear wheel 13 from the average trajectory 24 of the front wheels 6 and 7 is greater than the deviation B of the outer rear wheel 14 from the average trajectory 24 of the front wheels 6 and 7. Therefore, in a four-wheel drive motor vehicle in which the front wheel set and the rear wheel set are directly coupled, the inner rear wheel 13 in particular deviates in speed from other wheels and this may become a direct cause of the tight turn braking.

Therefore, according to the present invention, the torque transmission ratio of the viscous coupling 9 which transmits power to the inner rear wheel 13 is reduced (or made soft) during a turning action of the vehicle and a smooth turning of the vehicle is made possible. The steering angle at which the viscous coupling 9 for the inner rear wheel 13 is made soft is preferred to be determined as a mathematical function of the vehicle speed, and the process of making the viscous coupling soft may be performed in a discontinuous manner but may also be performed gradually so as to make the change in the properties of the viscous coupling unnoticeable.

On the other hand, when the vehicle is accelerating, since the speed difference between the front wheel set and the rear wheel set is absorbed by the slipping of the front wheels, no problem arises even when the torque transmission ratios of both the viscous couplings are increased (or made hard) and the traction of the rear wheel set is thereby increased. Thus, rear wheels can produce sufficient traction for better handling of the vehicle.

Also in a vehicle in which the four wheels are directly coupled only to a limited extent as is the case in a four-wheel drive motor vehicle using a viscous coupling, because of the tendency for the rear wheels to lock up during braking, it is preferable if the viscous couplings of both the rear wheels are made soft when a brake device is activated.

In a viscous coupling, if the speed difference between the input and the output shaft continues to be great for a certain time period, the temperature of the viscous fluid progressively rises. If this temperature rise becomes excessive, the function of the viscous coupling may be impaired. Therefore, according to the present embodiment, if it is detected that the temperature of the viscous coupling has exceeded a certain value in a low speed range, since it is conceivable that one of the wheels is slipping, for instance in muddy or frozen terrain, both the viscous couplings are made hard. If this does not stop the excessive temperature increase, since there is a possibility that something has become faulty, a warning may be issued. If the temperature of the viscous fluid becomes excessively high in a high speed range, it is conceivable that there is a difference in the diameters of the tires, the viscous coupling should be made soft so as to control the temperature increase. If this does not stop the excessive temperature increase, since there is a possibility that something has become faulty, a warning may be issued.

Now the action of the CPU 22 is described in the following with reference to the flow charts given in FIGS. 4 through 6.

Figure 4:
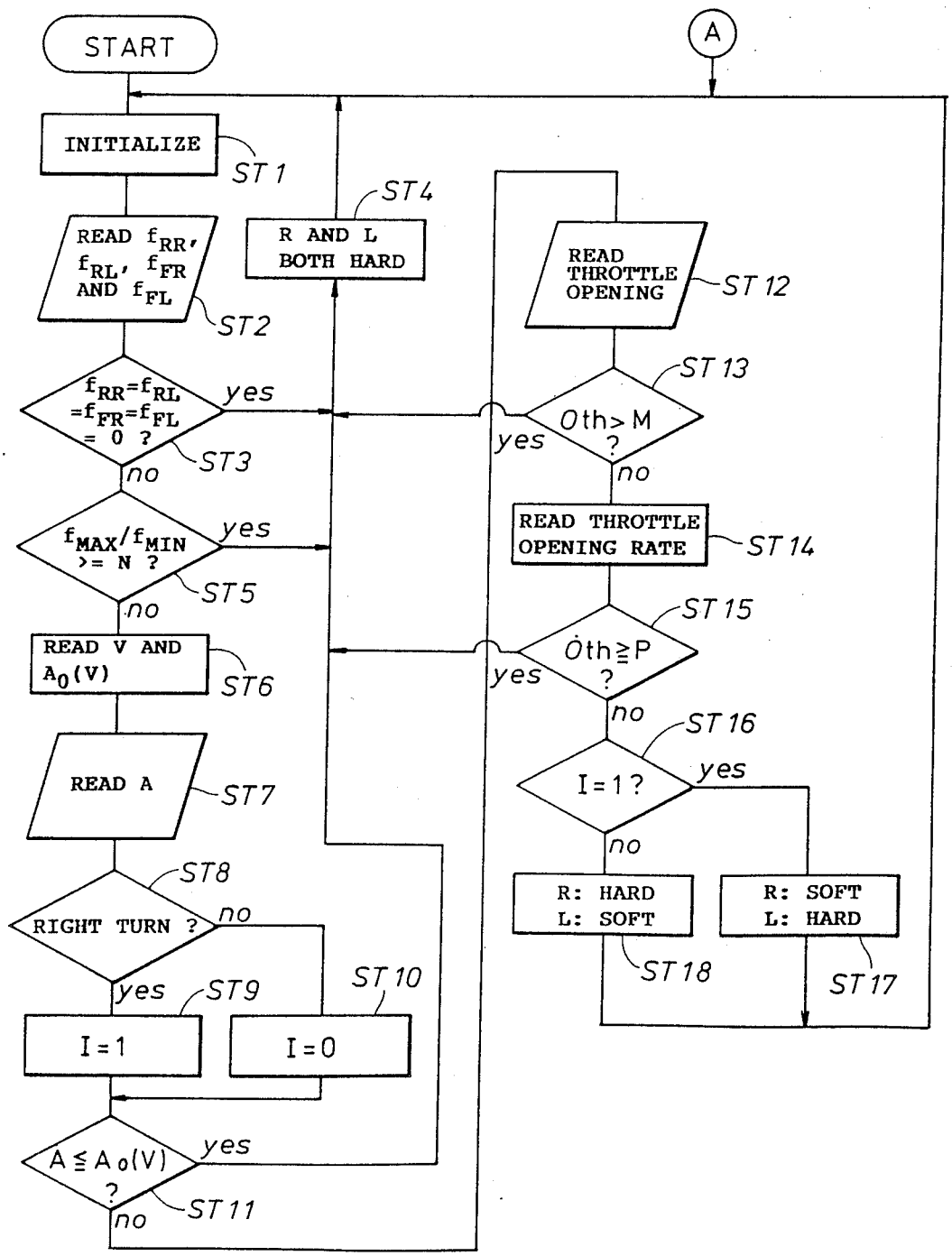
FIGS. 4 through 6 are flow charts showing the control sequence for controlling the viscous couplings of the four-wheel drive motor vehicle according to the present invention.

First of all, as shown in FIG. 4, variables and flags are cleared in ST1 and speed signals $f_{RR}$, $f_{RL}$, $f_{FR}$, $f_{FL}$ are read out from the speed sensors 15 through 18 in ST2. If the speed is found to be zero or the vehicle is stationary in ST3, the viscous couplings 9 and 10 of the right and left rear wheel are both made hard in ST4 and the system flow returns to ST1. If the vehicle is not found to be stationary in ST3, it is detected whether the ratio of the maximum to the minimum of the speeds of the wheels is equal to or greater than a certain value N in ST5. If the difference is equal to or greater than N, since it is conceivable that one of the wheels is slipping, the system flow advances to ST4 and all the viscous couplings are made hard.

If the ratio of the maximum to the minimum of the speeds of the wheels is not so great, the system flow advances to ST6 and the vehicle speed V and the prescribed value $A_0(V)$ of the steering angle are obtained. In ST7, the steering angle A is read from the steering angle sensor 21. The direction of the steering action is determined in ST8 and the flag I is set to 1 if the vehicle is making a right turn (ST9) and the flag I is set to 0 if the vehicle is making a left turn (ST10).

If the steering angle is equal to or less than the prescribed value $A_0$ in ST11, the system flow advances to ST4 and the viscous couplings are both made hard in ST4. If the steering angle is greater than the prescribed value $A_0$, it is determined in ST12 through ST15, whether the throttle opening angle $\theta_{th}$ or the throttle opening rate $d\theta_{th}/dt$ is greater than a predetermined value M or P, as the case may be, or whether the vehicle is accelerating or not, according to the output from the throttle opening sensor 20. Alternatively, a linear combination of the throttle opening angle $\theta_{th}$ or the throttle opening rate $d\theta_{th}/dt$ (or $a_1\theta_{th}+a_2d\theta_{th}/dt$) may be compared with a prescribed value. In any case, if the vehicle is accelerating, since the front wheels are slipping to a certain extent, the viscous couplings may be both made hard in ST4. If the vehicle is not accelerating, it is then determined whether the flag I is 0 or 1 in ST16. If the flag I is 1, the right rear wheel is made soft while the left rear wheel is made hard in ST17. Conversely, if the flag I is 0, the right rear wheel is made hard while the left rear wheel is made soft. In either case, the system flow subsequently returns to ST1 and the above mentioned process is repeated at a predetermined rate.

Figure 5:
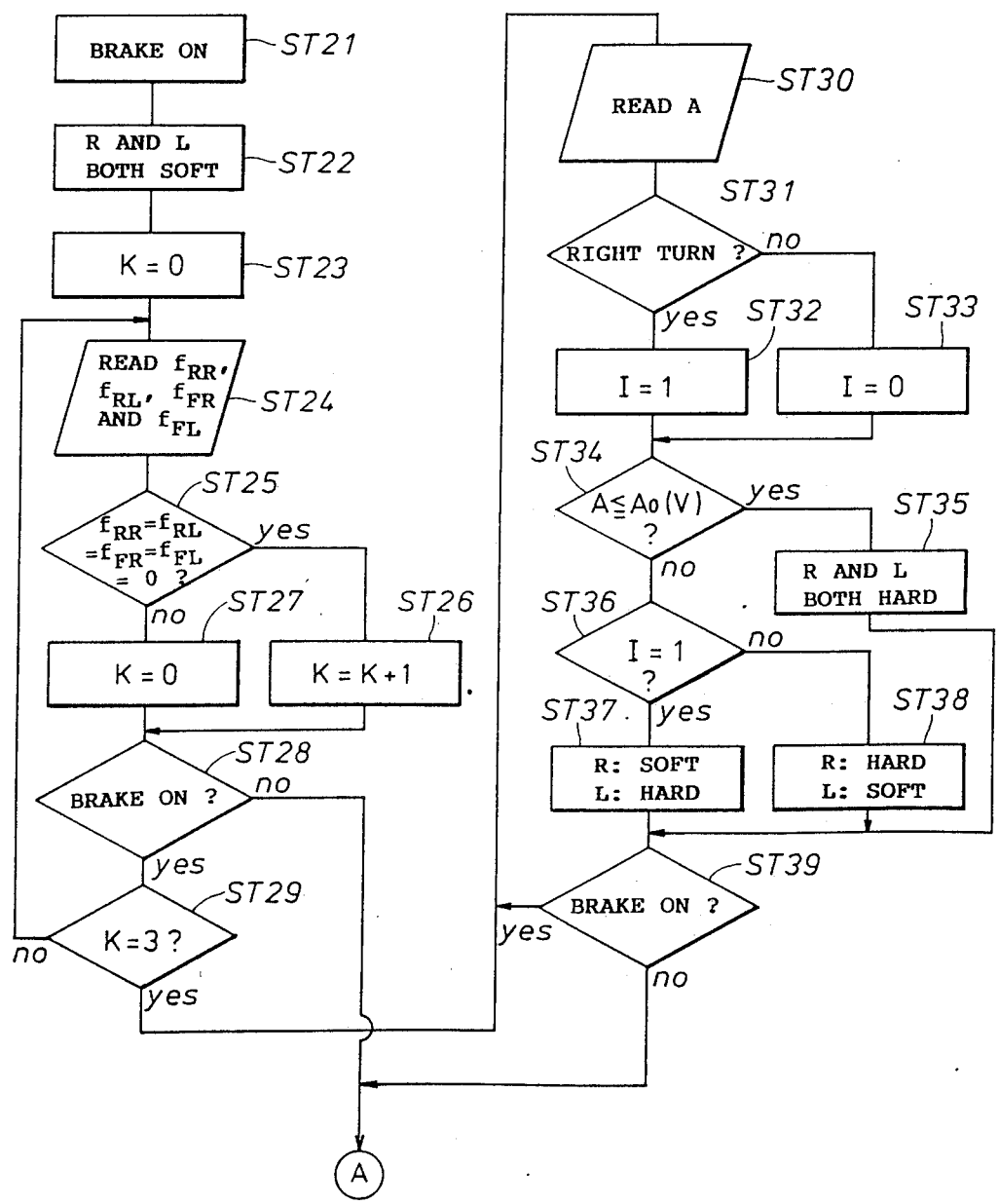

FIG. 5 shows an interruption routine which is carried out when a braking action is detected. If a braking action is detected in ST21 by the brake switch 19, the viscous couplings 9 and 10 are both made soft in ST22 so as to prevent the locking of the rear wheels. Then, an index K is set to 0 (ST23) and the rotational speed of each of the wheels is read out (ST24). If the rotational speeds of all the wheels are detected to be zero in ST25, 1 is added to the index K in ST26. If not all the rotational speeds of the wheels are 0, the index K is set to 0 in ST27.

If the termination of the braking action is detected in ST28, the system flow returns to ST1 of the main flow. On the other hand, if the braking action is still in progress, it is determined in ST29 whether the index K has reached 3 or not. If the index K is short of 3, the system flow returns to ST24. However, if the index K has reached 3 or if it is detected that the braking action is still in progress and, at the same time, the vehicle speed is 0, the steering angle A is read out in ST30. Thus, it is determined whether the vehicle is making a right turn or a left turn in ST31 through ST33; the flag I is set to 1 if the vehicle is making a right turn and the flag I is set to 0 if the vehicle is making a left turn.

If the steering angle is determined to be equal to or less than the predetermined value $A_0$ in ST34, the viscous couplings 9 and 10 are both made hard in ST35 and the system flow advances to ST39. If the steering angle is determined to be greater than the predetermined value $A_0$ in ST34, it is then determined in ST36 whether the flag I is 0 or 1. If the flag I is 1, the right rear wheel is made soft while the left rear wheel is made hard in ST37. Conversely, if the flag I is 0, the right rear wheel is made hard while the left rear wheel is made soft in ST38. Then, if the braking action is determined to be still in progress in ST39, the system flow returns to ST30. This is because the tight turn braking tends to occur in a very low speed range as a braking action is being performed. Otherwise or if the braking action has been terminated, the system flow returns to ST1 of the main flow.

Figure 6:
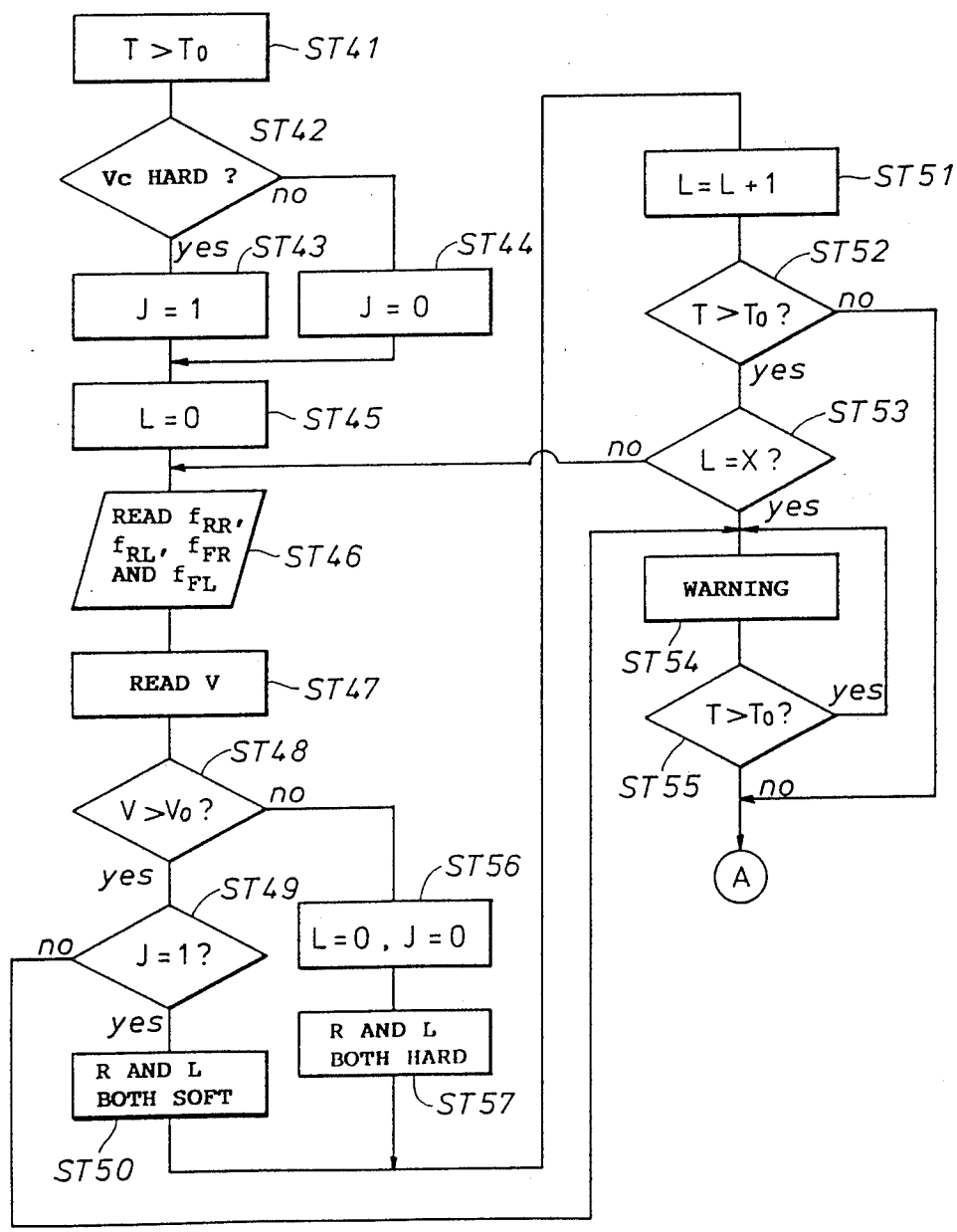

FIG. 6 shows another interruption routine which is carried out when the temperature of each of the viscous couplings has risen excessively. If the temperature T of one of the viscous couplings is determined to be in excess of a predetermined value $T_0$ in ST41, it is determined in ST42 whether the corresponding viscous coupling is presently hard or soft. If the viscous coupling is found to be hard. J is set to 1 in ST43. If not, J is set to 0 in ST44. In either case, L is set to 0 in ST45. The speed signals $f_{RR}$, $f_{RL}$, $f_{FR}$, $f_{FL}$ are read out in ST46 and the vehicle speed V is obtained in ST47 by averaging them.

If it is determined in ST48 that the vehicle speed V is greater than the predetermined value $V_0$, it is then determined in ST49 whether the viscous coupling is hard or soft. If J=1 or if the viscous coupling is hard, both the viscous couplings are made soft in ST50 and 1 is added to L in ST51. If the temperature T of the viscous coupling is still higher than $T_0$, it is determined in ST53 whether L=X (where X is a predetermined constant) or not. If L is short of X, the system flow returns to ST46.

If the vehicle speed V is determined to be equal to or less than the predetermined value $V_0$ in ST48, it is set that J=1 in ST56. Then, both the viscous couplings are made hard in ST57. This corresponds to such a case that one of the wheels is completely slipping in muddy or frozen terrain and, by making the viscous couplings hard, the capability of the vehicle to advance in muddy, frozen or otherwise slippery terrain is enhanced. Subsequently, the system flow advances to ST51.

If it is determined in ST49 that J=0 or that the viscous coupling is soft, since there is a chance that something is wrong, an alarm is sounded in ST54, and this state is repeated until it is detected in ST55 that the temperature of the viscous coupling has fallen below the predetermined value. When the temperature has fallen back to normal again, the system flow returns to ST1 of the main flow.

Thus, according to the present invention, the problems of four-wheel drive vehicles using viscous couplings are eliminated without reducing the advantages of four-wheel drive by advantageously controlling the viscous couplings, and significant advantages are thus obtained by the invention.

What we claim is:

1. A motor vehicle having a first axle shaft which is driven by a drive source and a second axle shaft which is driven by the same drive source, each of a pair of wheels associated with the second axle shaft being powered by way of individual variable torque transmitting means, further comprising:
   steering sensor means for detecting a steering angle of the vehicle;
   speed detection means for detecting a speed of the vehicle;
   a throttle opening sensor for detecting a throttle opening;
   control means which control a torque transmission ratio of each of the variable torque transmitting means by using the detected steering angle, vehicle speed and throttle opening as control parameters; and
   wherein said speed detection means comprises a speed sensor juxtaposed to each of the wheels for detecting a rotational speed thereof, and the torque transmission ratios of the two variable torque transmitting means are both increased when the speed sensors have detected that all the wheels are stationary.

2. A motor vehicle having a first axle shaft which is driven by a drive source and a second axle shaft which is driven by the same drive source, each of a pair of wheels associated with the second axle shaft being powered by way of individual variable torque transmitting means, further comprising:
   steering sensor means for detecting a steering angle of the vehicle;
   speed detection means for detecting a speed of the vehicle;
   a throttle opening sensor for detecting a throttle opening;
   control means which control a torque transmission ratio of each of the variable torque transmitting means by using the detected steering angle, vehicle speed and throttle opening as control parameters; and
   wherein the control means increases the torque transmission ratios of both the variable torque transmitting means when the throttle opening sensor has detected a throttle opening sensor has detected a throttle opening rate which is greater than a certain prescribed value.

3. A motor vehicle having a first axle shaft which is driven by a drive source and a second axle shaft which is driven by the same drive source, each of a pair of wheels associated with the second axle shaft being powered by way of individual variable torque transmitting means, further comprising:
   steering sensor means for detecting a steering angle of the vehicle;
   speed detection means for detecting a speed of the vehicle;
   a throttle opening sensor for detecting a throttle opening;
   control means which control a torque transmission ratio of each of the variable torque transmitting means by using the detected steering angle, vehicle speed and throttle opening as control parameters; and
   wherein the control means increases the torque transmission ratios of both the variable torque transmitting means when the throttle opening sensor has detected a linear combination of a throttle opening and a throttle opening rate which is greater than a certain prescribed value.

4. A motor vehicle as defined in claim 1, wherein the first axle shaft is a front axle shaft while the second axle shaft is a rear axle shaft, further comprising a brake sensor, the control means reducing the torque transmission ratios of both the variable torque transmitting means when the brake sensor has detected an activation of a brake device.

5. A motor vehicle having a first axle shaft which is driven by a drive source and a second axle shaft which is driven by the same drive source, each of a pair of wheels associated with the second axle shaft being powered by way of individual variable torque transmitting means, further comprising:
   steering sensor means for detecting a steering angle of the vehicle;
   speed detection means for detecting a speed of the vehicle;
   a throttle opening sensor for detecting a throttle opening;
   control means which control a torque transmission ratio of each of the variable torque transmitting means by using the detected steering angle, vehicle speed and throttle opening as control parameters; and
   wherein the variable torque transmitting means comprise a pair of viscous couplings having means for externally varying the torque transmission ratios thereof, each transmitting a torque, from the drive source to the corresponding one of the wheels of the second axle shaft, at a level which is substantially proportional to a speed difference between input and output of the viscous coupling; and
   further comprising a temperature sensor for each of the viscous couplings, the control means increasing the torque transmission ratios of both the viscous couplings when one of the temperature sensors has detected a temperature higher than a prescribed value in a low speed range.

6. A motor vehicle as defined in claim 5, further comprising timer means, the control means issuing a warning when the torque transmission ratios of both the viscous couplings have been increased for a certain time interval and, yet, the temperature sensor continues to detect a temperature higher than the prescribed value.

7. A motor vehicle having a first axle shaft which is driven by a drive source and a second axle shaft which is driven by the same drive source, each of a pair of wheels associated with the second axle shaft being powered by way of individual variable torque transmitting means, further comprising:

steering sensor means for detecting a steering angle of the vehicle;

speed detection means for detecting a speed of the vehicle;

a throttle opening sensor for detecting a throttle opening;

control means which control a torque transmission ratio of each of the variable torque transmitting means by using the detected steering angle, vehicle speed and throttle opening as control parameters; and wherein the variable torque transmitting means comprise a pair of viscous couplings having means for externally varying the torque transmission ratios thereof, each transmitting a torque, from the drive source to the corresponding one of the wheels of the second axle shaft, at a level which is substantially proportional to a speed difference between input and output of the viscous coupling; and further comprising a temperature sensor for each of the viscous couplings, the control means reducing the torque transmission ratios of both the viscous couplings when the temperature sensor has detected a temperature higher than a prescribed value in a high speed range.

8. A motor vehicle as defined in claim 7, further comprising timer means, the control means issuing a warning when the torque transmission ratios of both the viscous couplings have been reduced for a certain time interval and, yet, the temperature sensor continues to detect a temperature higher than the prescribed value.

9. A motor vehicle having a first axle shaft which is driven by a drive source and a second axle shaft which is driven by the same drive source, each of a pair of wheels associated with the second axle shaft being powered by way of individual variable torque transmitting means, further comprising:

steering condition sensor means for detecting a steering condition of the vehicle;

control means which controls a torque transmission ratio of each of the variable torque transmitting means according to the steering condition detected by the steering condition sensor means; and wherein a speed sensor is provided in each of the wheels for detecting a rotational speed thereof, and the torque transmission ratios of the two variable torque transmitting means are both increased when the speed sensors have detected that all the wheels are stationary.

10. A motor vehicle having a first axle shaft which is driven by a drive source and a second axle shaft which is driven by the same drive source, each of a pair of wheels associated with the second axle shaft being powered by way of individual variable torque transmitting means, further comprising:

steering condition sensor means for detecting a steering condition of the vehicle;

control means which controls a torque transmission ratio of each of the variable torque transmitting means according to the steering condition detected by the steering condition sensor means; and further comprising a throttle opening sensor, the control means increasing the torque transmission ratios of both the variable torque transmitting means when the throttle opening sensor has detected a throttle opening rate which is greater than a certain prescribed value.

11. A motor vehicle having a first axle shaft which is driven by a drive source and a second axle shaft which is driven by the same drive source, each of a pair of wheels associated with the second axle shaft being powered by way of individual variable torque transmitting means, further comprising:

steering condition sensor means for detecting a steering condition of the vehicle;

control means which controls a torque transmission ratio of each of the variable torque transmitting means according to the steering condition detected by the steering condition sensor means; and further comprising a throttle opening sensor, the control means increasing the torque transmission ratios of both the variable torque transmitting means when the throttle opening sensor has detected a linear combination of a throttle opening and a throttle opening rate which is greater than a certain prescribed value.

12. A motor vehicle having a first axle shaft which is driven by a drive source and a second axle shaft which is driven by the same drive source, each of a pair of wheels associated with the second axle shaft being powered by way of individual variable torque transmitting means, further comprising:

steering condition sensor means for detecting a steering condition of the vehicle;

control means which controls a torque transmission ratio of each of the variable torque transmitting means according to the steering condition detected by the steering condition sensor means;

wherein the variable torque transmitting means comprise a pair of viscous couplings having means for externally varying the torque transmission ratios thereof, each transmitting a torque, from the drive source to the corresponding one of the wheels of the second axle shaft, at a level which is substantially proportional to a speed difference between input and output of the viscous coupling; and further comprising a temperature sensor for each of the viscous couplings, the control means increasing the torque transmission ratios of both the viscous couplings when one of the temperature sensors has detected a temperature higher than a prescribed value in a low speed range.

13. A motor vehicle as defined in claim 12, further comprising timer means, the control means issuing a warning when the torque transmission ratios of both the viscous couplings have been increased for a certain time interval and, yet, the temperature sensor continues to detect a temperature higher than the prescribed value.

14. A motor vehicle having a first axle shaft which is driven by a drive source and a second axle shaft which is driven by the same drive source, each of a pair of wheels associated with the second axle shaft being powered by way of individual variable torque transmitting means, further comprising:

steering condition sensor means for detecting a steering condition of the vehicle;

control means which controls a torque transmission ratio of each of the variable torque transmitting means according to the steering condition detected by the steering condition sensor means;

wherein the variable torque transmitting means comprise a pair of viscous couplings having means for externally varying the torque transmission ratios thereof, each transmitting a torque, from the drive source to the corresponding one of the wheels of the second axle shaft, at a level which is substantially proportional to a speed difference between input and output of the viscous coupling; and further comprising a temperature sensor for each of the viscous couplings, the control means reducing the torque transmission ratios of both the viscous couplings when the temperature sensor has detected a temperature higher than a prescribed value in a high speed range.

15. A motor vehicle as defined in claim 14, further comprising timer means, the control means issuing a warning when the torque transmission ratios of both the viscous couplings have been reduced for a certain time interval and, yet, the temperature sensor continues to detect a temperature higher than the prescribed value.

* * * * *